(12) United States Patent
Yang

(10) Patent No.: US 8,886,859 B2
(45) Date of Patent: Nov. 11, 2014

(54) USB STORAGE DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/038,764

(22) Filed: Sep. 27, 2013

(65) Prior Publication Data

US 2014/0250247 A1  Sep. 4, 2014

(30) Foreign Application Priority Data

Mar. 1, 2013  (CN) .......................... 2013 1 00636559

(51) Int. Cl.
*G06F 3/06* (2006.01)
*G06F 13/38* (2006.01)

(52) U.S. Cl.
CPC ................ *G06F 13/385* (2013.01); *G06F 3/06* (2013.01)

USPC ............. 710/74; 710/2; 710/5; 710/8; 710/62

(58) Field of Classification Search
None
See application file for complete search history.

(56) References Cited

U.S. PATENT DOCUMENTS

2004/0205283 A1* 10/2004 Liu ................................ 710/315
2005/0278554 A1* 12/2005 Frank ............................ 713/300

* cited by examiner

*Primary Examiner* — Scott Sun
(74) *Attorney, Agent, or Firm* — Novak Druce Connolly Bove + Quigg LLP

(57) ABSTRACT

A USB storage device includes a PCIE connector, USB flash drives, USB buses, a USB controller, and a voltage conversion unit. The PCIE connector connects to a motherboard of an electronic device and includes a power pin and at least on data pin. The USB controller includes a USB power pin, at least one USB data pin, and a number of bus ports. The USB data pin is connected to the data pin, each bus port of the USB controller is connected to one USB flash drive via a USB bus. The voltage conversion unit is connected between the power pin of the PCIE connector and the USB power pin of the USB controller, and converts a first voltage of the power pin of the PCIE connector to a second voltage to power the USB controller.

5 Claims, 1 Drawing Sheet

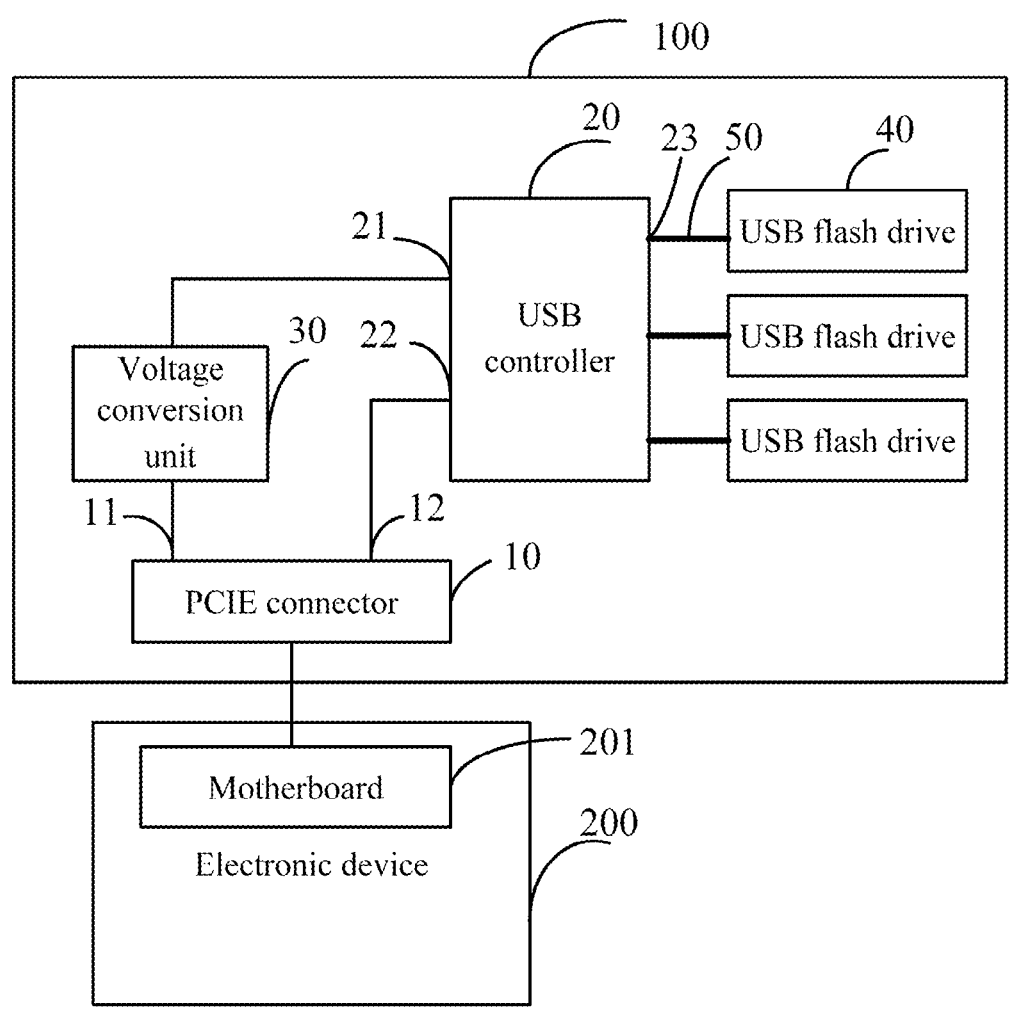

USB STORAGE DEVICE

BACKGROUND

1. Technical Field

The present disclosure relates to storage devices, particularly, to a universal serial bus storage device

2. Description of Related Art

Universal serial bus (USB) flash drives with USB connectors are widely used. USB flash drives can be used normally as a hard disk of an electronic device and never be removed. However, the storage space of the common USB flash drive is limited, usually cannot satisfy the requirement of large size storage. Besides, the common USB flash drive needs to be plugged into a USB interface of an electronic device when in use as the hard disk, and can be accidentally pulled out, which may cause damage to the electronic device.

A USB storage device to overcome the described limitations is thus needed.

BRIEF DESCRIPTION OF THE DRAWINGS

Many aspects of the present disclosure are better understood with reference to the following drawing. The components in the drawing are not necessarily drawn to scale, the emphasis instead being placed upon clearly illustrating the principles of the present disclosure. Moreover, in the drawing, like reference numerals designate corresponding parts throughout the view.

The FIGURE is a block diagram of a USB storage device in accordance with an exemplary embodiment.

DETAILED DESCRIPTION

Embodiments of the present disclosure will be described with reference to the accompanying drawing. The disclosure is illustrated by way of example and not by way of limitation in the FIGURE of the accompanying drawing in which like references indicate similar elements. It should be noted that references to "an" or "one" embodiment in this disclosure are not necessarily to the same embodiment, and such references mean "at least one."

The FIGURE illustrates a universal serial bus (USB) storage device 100. The USB storage device 100 includes a peripheral component interconnect express (PCIE) connector 10, a USB controller 20, a voltage conversion unit 30, a number of USB flash drives 40, and a number of USB buses 50.

The PCIE connector 10 is used to connect to a motherboard 201 of an electronic device 200. Therefore, the USB storage device 100 can be plugged into the motherboard 201 located inside the electronic device 200. The PCIE connector 10 includes a power pin 11 and at lease one data pin 12.

The USB controller 20 includes a USB power pin 21, at least one USB data pin 22, and a number of bus ports 23.

The voltage conversion unit 30 is connected between the power pin 11 of the PCIE connector 10 and the USB power pin 21 of the USB controller 20, and is used to convert a voltage of the power pin 11 of the PCIE connector 10 to a suitable voltage to power the USB controller 20 via the USB power pin 21. The USB data pin 22 of the USB controller 20 is connected to the data pin 12 of the PCIE connector 10. Each bus port 23 of the USB controller 20 is connected to one USB flash drive 40 via one corresponding USB bus 50. The USB controller 20 is used to establish a communication between the USB flash drives 40 and the PCIE connector 10, and transmit data from the USB flash drives 40 to the PCIE connector 10 and then to the motherboard 201 of the electronic device 200, or transmit the data from the motherboard 201 of the electronic device 200 to the USB flash drives 40.

In the embodiment, data transmitted by data pin 12 of the PCIE connector 10 and the USB data pin 22 of the USB controller 20 all are differential signals. Therefore, the USB controller 20 can transmit the same data between the PCIE connector 10 and the number of the USB flash drives. In the embodiment, the USB controller 20 transmits USB data between the PCIE connector 10 and the number of the USB flash drives. Namely, the USB controller 20 transmits the USB data from the USB flash drives 40 to the PCIE connector 10 and then to the motherboard 201, or vise versa.

In the embodiment, the USB controller 20 selects one of the USB flash drives to communicate with the PCIE connector 10 and then communicates with the motherboard 201 of the electronic device 200 via a method of chip select. Therefore, the number of USB flash drives 40 of the USB storage device 100 can be identified by the electronic device 200 and can be accessed by the electronic device 200.

In the embodiment, the USB storage device 100 supports USB 3.0 protocol. That is, the USB controller 20 transmits the USB date with USB 3.0 protocol between the USB flash drives 40 and the PCIE connector 10.

Therefore, in the present disclosure, the USB storage device 100 includes a number of USB flash drives 40 and then has a large size of storage space accordingly. Besides, the USB storage device 100 is connected to the inner motherboard 201 of the electronic device 200, thus the USB storage device 100 is within the inner of the electronic device 200 and does not affect the aspect of the electronic device 200 and cannot be pulled out easily.

In the embodiment, the electronic device 200 adopts a particular system platform, such as a "denlow" system platform (next generation desktop system platform), the motherboard 201 of the electronic device 200 can transmit USB 3.0 data or PCIE data via the same port/bus based on the "denlow" system platform.

In the embodiment, the electronic device 200 can be a desktop computer, a portable computer, a tablet computer, a server, and other computers, and also can be a mobile phone, a digital camera, a digital photo frame with a PCIE port.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A universal serial bus (USB) storage device comprising:
   a peripheral component interconnect express (PCIE) connector configured to connect to a motherboard of an electronic device, wherein, the PCIE connector comprises a power pin and at least one data pin;
   a plurality of USB flash drives;
   a plurality of USB buses;
   a USB controller comprising a USB power pin, at least one USB data pin, and a plurality of bus ports, wherein, the at least one USB data pin of the USB controller is configured to connect to the at least one data pin of the PCIE connector, each bus port of the USB controller is connected to one of the USB flash drives via a corresponding one of the USB buses; and
   a voltage conversion unit connected between the power pin of the PCIE connector and the USB power pin of the USB controller, and configured to convert a first voltage of the power pin of the PCIE connector to a second voltage to power the USB controller via the USB power pin.

2. The USB storage device according to claim 1, wherein the USB controller establishes a communication between the PCIE connector and the plurality of the USB flash drives and transmits data between the PCIE connector and the plurality of the USB flash drives.

3. The USB storage device according to claim 2, wherein the USB controller transmits USB data between the PCIE connector and the plurality of the USB flash drives.

4. The USB storage device according to claim 3, wherein the USB controller supports USB 3.0 protocol.

5. The USB storage device according to claim 2, wherein the USB controller selects one of the USB flash drives to communicate with the PCIE connector and then communicate with the motherboard of the electronic device via a method of chip select, thus the plurality of USB flash drives of the USB storage device can be identified and accessed by the electronic device.

* * * * *